United States Patent [19]

McMahan, Jr.

[11] Patent Number: 5,020,904
[45] Date of Patent: Jun. 4, 1991

[54] DYNAMIC LASER SPECKLE PROFILOMETER AND METHOD

[76] Inventor: Robert K. McMahan, Jr., 103 Laurel Hill Circle, Chapel Hill, N.C. 27514

[21] Appl. No.: 403,733
[22] Filed: Sep. 6, 1989
[51] Int. Cl.$^5$ .............................................. G01B 9/02
[52] U.S. Cl. .................................... 356/35.5; 356/354
[58] Field of Search ............................. 356/35.5, 354

[56] References Cited

U.S. PATENT DOCUMENTS 4,913,550  4/1990  Montgomery et al. ............. 356/354

Primary Examiner—Davis L. Willis
Assistant Examiner—Matthew W. Koren
Attorney, Agent, or Firm—William M. Hobby, III

[57] ABSTRACT

A Dynamic Laser Speckle Profilometer (DLSP) apparatus and method are provided to preform nondestructive analysis of materials, components, and assemblies by creating an optoelectronic phase map. This phase map is used to generate the deformation and resonance mode mapping of an object under test. The Dynamic Laser Speckle Profilometer system is based upon the low optical noise design of a double pulsed laser speckle interferometer incorporating a single frequency polarized laser, a high bandwidth amplitude modulator, a phase modulator, a phase tracker, a range finder, and a light sensitive surface, all under computer control. This produces a series of interference images of an object under test. The dynamic laser speckle profilometer method uses a series of interference images, the Carre' phase algorithm, and recursive speckle elimination, to produce phase maps of the object under test. The method uses a series of phase maps, and an absolute phase calculation to produce deformation maps and resonance mode maps of the object under test. Additional post processing is used to produce displacement maps, stress and strain maps, and bending moments, all of which are desirable for verification of finite elemental analysis of materials, components, and assemblies.

16 Claims, 3 Drawing Sheets

DYNAMIC LASER SPECKLE PROFILOMETER AND METHOD

BACKGROUND OF THE INVENTION

The present invention is a Dynamic Laser Speckle Profilometer (DLSP) apparatus and a dynamic laser speckle profilometer method, to preform nondestructive analysis of materials, components, and assemblies by creating an optoelectronic phase map leading to the deformation and resonance mode mapping of an object under test.

This invention relates to interferometers of the kind comprising an optical imaging system disposed optically between an object location and an image location. There is a means for producing a beam of coherent light with separate object and reference beams respectively directed to the object and image locations. In this manner, when a light-scattering surface is disposed at the object location so as to be illuminated by the object beam and a screen is disposed at the image location so as to be illuminated by the reference beam, light from the object beam scattered by said surface will be imaged on the screen. The imaging system will cause interference at the screen with the light of the reference beam and the scattered object beam.

Interferometers of the kind specified are particularly adapted for use in inspection systems employing the techniques of electronic speckle pattern interferometry.

Using an interferometer of the kind specified, a surface to be inspected is disposed at the object location, and disposed at the image location is a photo-sensitive screen of a television camera device, such as a vidicon tube. There is a means to derive a video signal representing the point-by-point variations of intensity in the resultant pattern of illumination formed on the screen. Because it is partly formed by the imaging of scattered coherent light, this pattern of illumination exhibits the phenomenon known as "speckle effect". By virtue of the form of the reference beam, the range of spatial frequencies in the resultant pattern of illumination will not extend materially beyond the range of spatial frequencies in the "speckle pattern". The aperture should be made sufficiently small to ensure that the spatial frequencies in the pattern of illumination formed on the screen lie wholly or mainly within the range which can be resolved by the television camera device. As a typical example, an aperture of f/16 may suitably be used when the television camera device is a standard 2.5 cm vidicon tube capable of resolving 600 picture lines.

In prior British Patent Specification no. 1,392,448, of the National Research Development Corporation an optical inspection system is provided which uses speckle pattern for optical inspection by correlating two similar video signals representing point by point variations of intensity in two patterns of illumination from the irradiation of a photosensitive screen with light from first and second interfering beams, one of which is a pattern of illumination from light scattered from the surface of an object being inspected. A related British Patent Specification No. 1,460,861 by the same company uses the same technique but light imaged by the imaging system is arranged to be reflected to the image location by a planar mirror which also serves as a spatial filter for the second beam. In a third related British specification no. 1,593,284 an Optical Inspection system using the same speckle interferometer technique and deriving from a video screen a video signal representing the spatial variations in the sum of the intensities in two patterns of illumination independently on the screen.

Aside from the basic laws of physics for optics which dictate the criteria for the "speckle effect", the present invention goes beyond the invention taught in these British Patents by creating a new low noise optical design with the capabilities of making continuous or pulsed measurements, modulating the phase of the reference beam, phase tracking the relative phase shift caused by the motion of the object under test with respect to the DLSP by incorporating a laser range finder. This laser range finder is coupled to a phase tracker in the reference beam. The entire system is controlled through a central CPU to produce optoelectronic phase maps of the object under test which can then be used by the system to produce deformation maps, resonance maps, displacement maps, stress and strain maps, bending moment maps. All of which, can further be used by the system for finite elemental analysis, mode analysis, deformation profilometry, and resonance amplitude analysis.

SUMMARY OF THE INVENTION

A Dynamic Laser Speckle Profilometer (DLSP) apparatus is provided with a dynamic laser speckle profilometer method for producing a phase map of an object under test to preform nondestructive analysis of materials, components and assemblies. The Dynamic Laser Speckle Profilometer system includes a single frequency, polarized laser with sufficient coherence length to eliminate the need for optical path length compensation optics; a high bandwidth amplitude modulator to allow continuous wave (CW) operation, for static deformation applications, or pulse (stroboscopic) operation, for vibrational mode analysis applications; a polarization coupling device to split the beam of the laser into an object and reference beam, while allowing control of the relative intensity of the reference beam; a phase modulator for incrementing the phase of the reference beam relative to the object beam, to create different states of known phase offset; projection optics, with an integral spatial filter and mirror assembly, for projection of the object beam on to the test object and retrieval of the reflected beam from the object under test; imaging optics to image the object under test; a phase tracker located in the reference beam path, which includes a range finder connected thereto and positioned to continuously measure the range of the object under test, for compensation of phase irregularities caused by movement of the object under test relative to the Dynamic Laser Speckle Profilometer System; combining optics, with an integral spatial filter and mirror assembly, to combine the reference beam and object under test image; a light sensitive surface to produce a signal analogous the interference of the reference beam and the image of the object under test.

A Dynamic Laser Speckle Profilometer method for producing a phase map of an object includes the steps for generating a series of digitally stored intensity distribution images corresponding to four different sets of phase offset values; applying the Carre' phase algorithm; checking the data set for bad pixels; applying a point by point continuity criterion; checking the speckle resolution and Nyquist constraint for verification of the quality of the data set; applying the data set to a recursive speckle elimination algorithm to eliminate noise from the data by computing the local means and local variances, and applying a filter to the entire image area; and finally producing a phase map. The DLSP method also includes steps for creating a deformation/resonance mode map by subtracting a series of phase maps from each other to create a relative displacement map; to which a zeroth order fringe, for dynamic data, or a null test, for static data, or operator supplied point of known phase can be applied to calculate the absolute phase map from which deformation and or resonance mode maps can be created. Further post processing of the data will provide derivatives of the absolute phase map for displacement maps, stress and strain maps, and bending moments, which are all used for mode analysis, finite elemental analysis, deformation profilometry, and resonance analysis.

BRIEF DESCRIPTION OF DRAWINGS

Other objects, features, and advantages of the present invention can be seen from the written description and from the drawings in which.

DESCRIPTION OF THE PREFERRED EMBODIMENT

Figure 1:
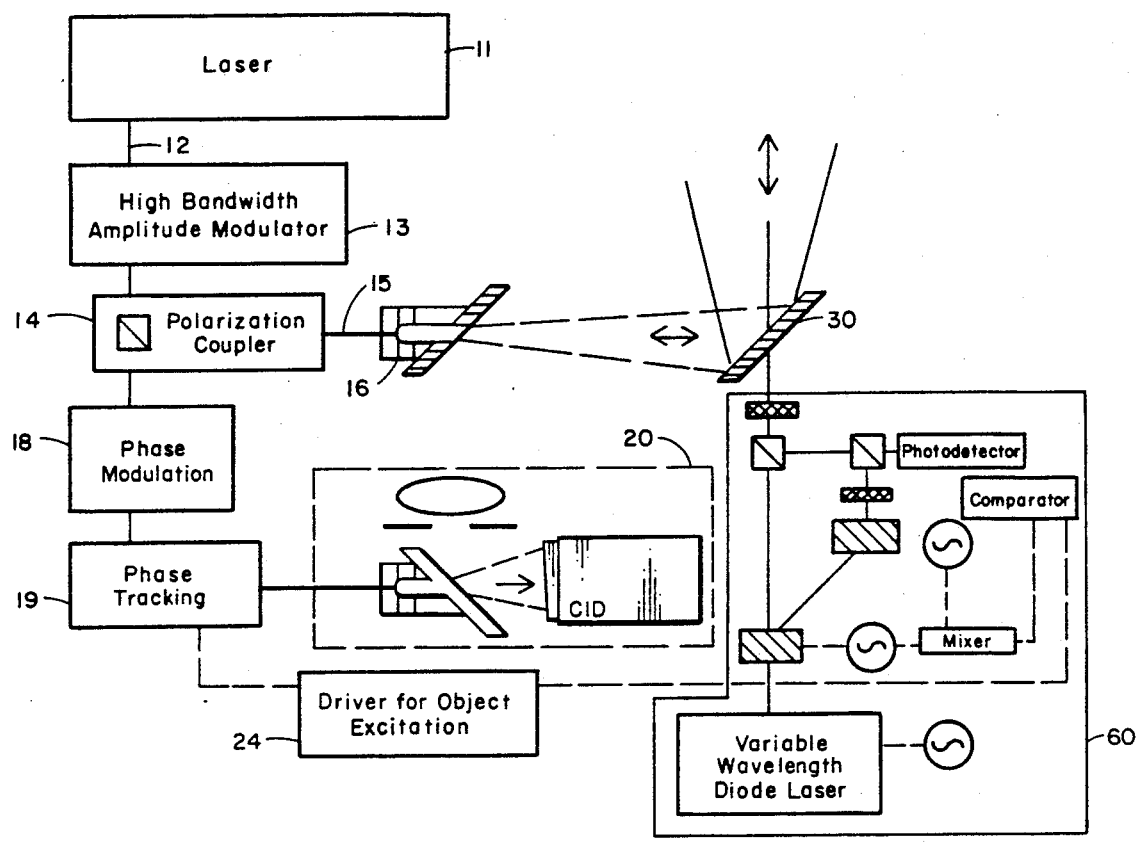
FIG. 1 is a block diagram of a Dynamic Laser Speckle Profilometer in accordance with the present invention.

Referring to the drawings in FIG. 1 a diagram of the Dynamic Laser Speckle Profilometer having a single frequency polarized ion laser 11, and a computer controlled high bandwidth electro-optic amplitude modulator 13 with an integral active feedback circuit. A polarization coupler 14 consists of a computer controlled motorized half wave plate and a polarizing beam splitter. An integral spatial filter and mirror assembly 16 is shown in more detail in FIG. 4. A computer controlled high bandwidth electro-optic phase modulator 18 has an integral active feedback circuit, and is coupled a phase tracker 19 consisting of a computer controlled piezo electric driven mirror which is phase locked to the driver for object under test excitation and the laser range finder described later. A low noise beam combiner 20 is in a dashed box and is shown in more detail in connection with FIG. 3. The laser range finder portion 60, consists of all items inside the solid line box and is shown in more detail in connection with FIG. 2. A planar front surface mirror 30 has a clearance aperture.

Figure 2:
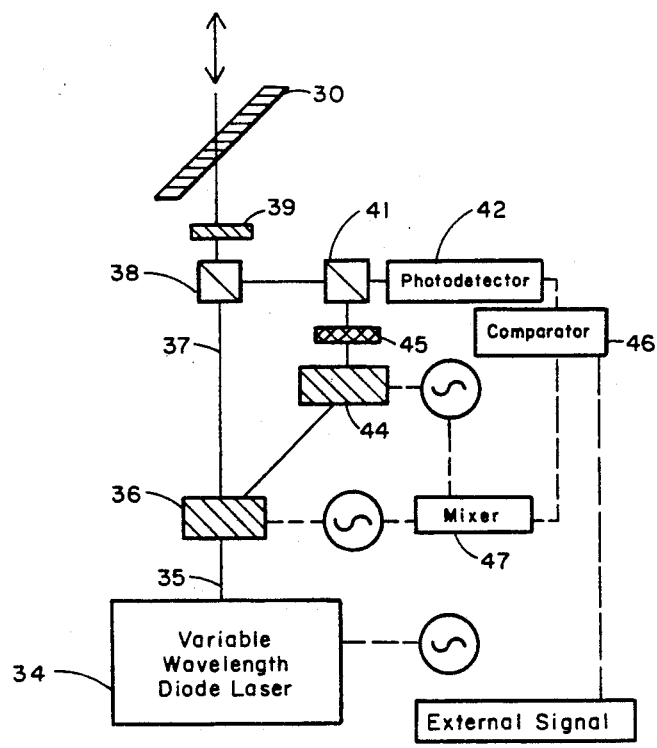
FIG. 2 is a diagrammatic view of the laser range finder portion of FIG. 1.

FIG. 2 is a diagram of the laser range finder for the phase tracking system in the Dynamic Laser Speckle Profilometer of FIG. 1. The range finder has a variable wavelength laser diode 34, acousto-optic modulators 36 and 44, polarizing beam splitters 38 and 41, a quarter wave plate 39, a half wave plate 45, a photodetector 42, a signal comparator circuit 46, and a frequency mixer circuit 47.

Figure 3:
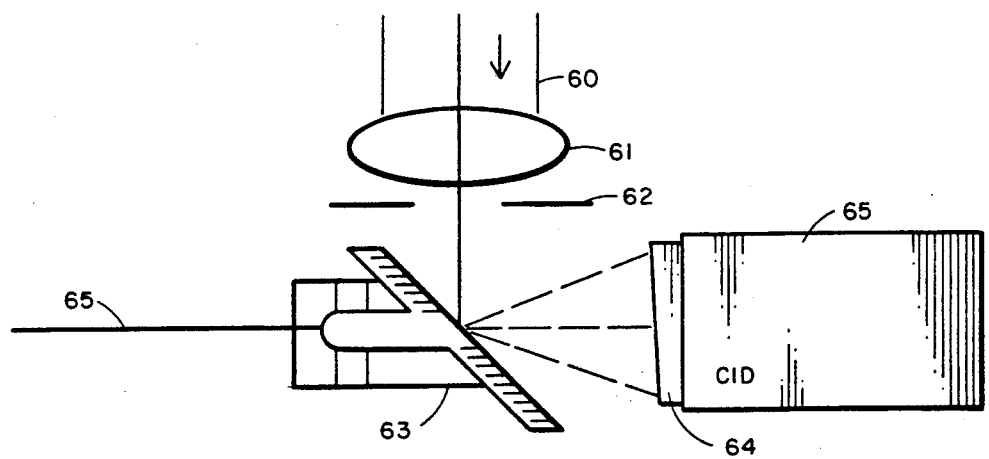
FIG. 3 is a diagrammatic view of a low noise beam combiner for the profilometer of FIG. 1.

FIG. 3 is a diagram of the low optical noise beam combiner portion of the DLSP system of FIG. 1. The beam combiner has a reference beam 65 of the DLSP system, and a reflected object beam 60 from the object under test. An integral spatial and mirror assembly 63 is shown in more detail in FIG. 4. A one degree wedged window 64 is for the, CID camera 60.

Figure 4:
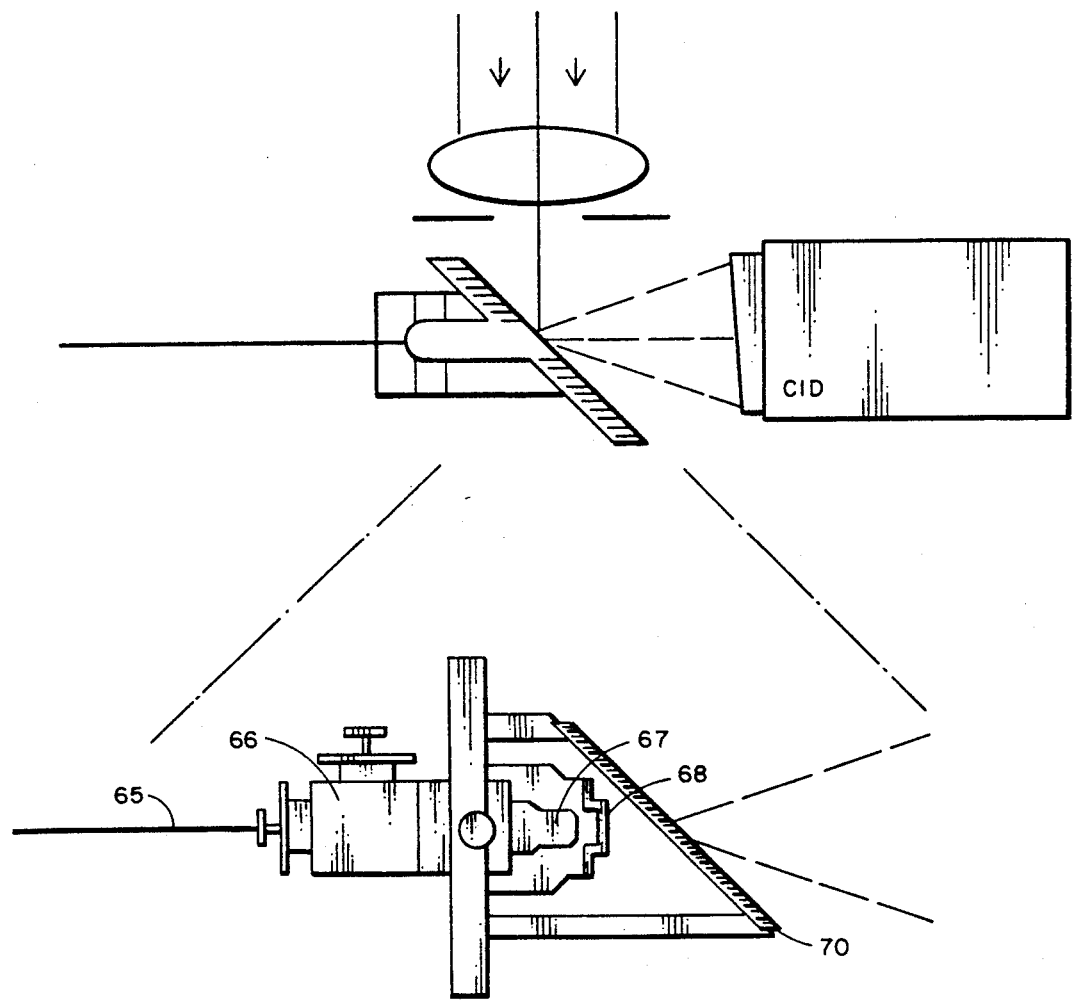
FIG. 4 is a diagrammatic view of the integral spatial filter and mirror assembly of FIGS. 1 and 3.

FIG. 4 is a diagram of the integral spatial filter and mirror assembly of FIGS. 1 and 3. An XYZ manual positioning stage assembly 66 has individual table locks. The filter and mirror assembly has an objective lens 67, a pin hole aperture 68, and a front surface reflecting planar mirror 70 with a clearance hole positioned the center of the back surface.

Figure 5:
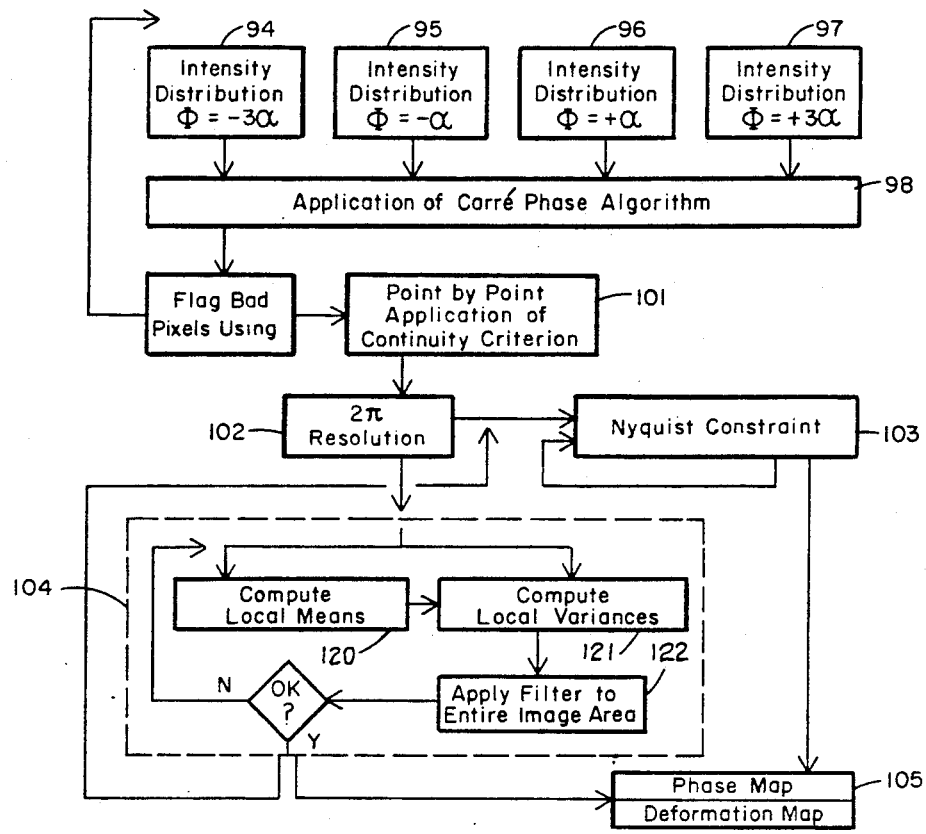
FIG. 5 is a flow diagram of the calculation of the initial phase map.

FIG. 5 is the flow diagram for the phase map calculation portion of the DLSP method. The individual intensity distribution images 94, 95, 96, and 97 are from the CID camera of the DLSP system. The application of the Carre' phase algorithm 98, tests for bad pixels 100. The application of the continuity criterion at 101, while a check of speckle resolution is preformed at 102. A check of the Nyquist constraint is preformed at 103. The recursive speckle elimination 104 in the dashed box includes computation of the local means 120, computation of the local variances 121, and applying a filter to the entire image area at 122. A phase map produced at 105 from all the computations.

Figure 6:
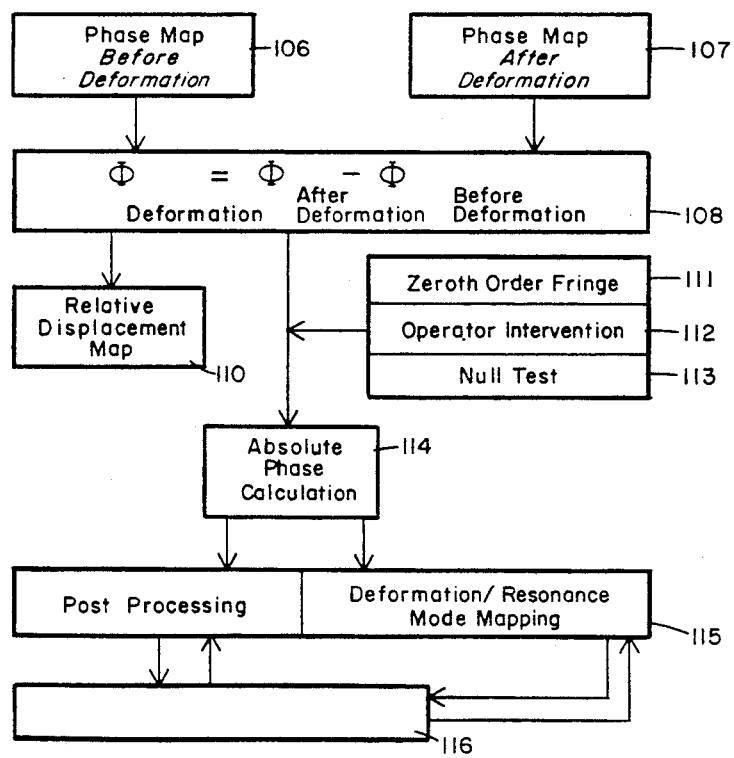
FIG. 6 is a flow diagram of the calculation of deformation.

FIG. 6 is the flow diagram for the deformation map and resonance mode map calculation portion of the DLSP method. The individual phase maps 106 and 107 from the computations outlined in FIG. 1 is frame subtraction 108. A relative deformation map 110 is produced by the frame subtraction 108. The zero order fringe 111, the operator intervention 112, and the null test 113 are to introduce a point of known phase. Absolute phase is calculated at 114. The deformation map and resonance mode map 215 are from the computations of the absolute phase calculation 114, and the result of additional post processing 116 is preformed on the results of the mapping 115.

Referring to the drawings and elaborating on the description of the individual items discussed hereinabove, a description of the operation of the Dynamic Laser Speckle Profilometer apparatus and methodology is provided herewith.

Beginning with FIG. 1, the DLSP system uses a single frequency polarized ion laser (11) as a light source. The use of a single frequency laser was chosen for the long coherence length of the emitted laser beam. This eliminates the requirement for path length compensation optics of previous speckle interferometer designs. It should be noted that the use of a pulsed laser source of sufficient coherence length, laser diodes, laser diode pumped solid state lasers, or multiple frequency laser sources with the necessary path length compensation optics, may be utilized without departing from the spirit and scope of this invention. The polarized laser beam (12) from the laser (11) is passed through a high bandwidth electro-optic amplitude modulator (13). An electro-optic amplitude modulator was chosen for its high bandwidth (0 to 50,000 Hz), high extinction ratio, the capability to be computer controlled, and the integral active feedback circuit which is used not only to track the modulation but also allows the modulator to be used to remove any high frequency noise component in the laser beam. Any type of amplitude modulator with sufficient bandwidth and appropriate computer control capability such as an acousto-optic modulator, or mechanical shuttering device may be used with out departing from the spirit and scope of the invention. The electro-optic amplitude modulator (13) allows the system to be operated in either a continuous (CW) mode, for static deformation analysis, or a pulsed (stroboscopic) mode, for vibrational mode analysis of test objects undergoing oscillatory motion. The now modulated, polarized laser beam passes into a polarization coupler (14) which separates the incoming beam into the object beam (15) and the reference beam (17). This polarization coupler consists of a half wave plate and a polarizing beam splitter. The half wave plate is mounted on a computer controlled, motorized rotary stage. Since the incoming laser beam is linearly polarized, the rotation of the half wave plate will determine the ratio of light that will be split from the incoming laser beam by the polarizing beam splitter. This method was chosen to take advantage of the natural characteristics of the laser system and eliminate the requirement for a variable attenuator, often used in other designs for controlling the intensity of the reference beam, thus eliminating the induced optical noise associated with such devices. The object beam (15) is passed through an integral spatial filter and mirror assembly (16), shown in greater detail in FIG. 4, which produces a uniform illumination beam projected by a second mirror (30) on to the object under test.

FIG. 4, which shows the integral spatial filter and mirror assembly for the reference beam, relates to item (16) of FIG. 1 in that the basic components are identical but the mirror angle is opposite to that shown. Referring to FIG. 4, the object beam passes through the objective lens (67) which is mounted to the manual three axis (XYZ) positioning stages (66). This allows for the alignment of the objective lens (67) to the pin hole aperture (68). Items (67) and (68) make up what is commonly known as a spatial filter which is used to select the most uniform wave front section of the incoming laser beam. The XYZ positioning stages (66) also contain a locking mechanism to prevent unwanted alignment wandering of the objective lens. The pin hole aperture (68) is made from a copper alloy which is preferred for high power laser beams. The laser beam is focused by the objective lens and passes through the pin hole aperture in a diverging beam and passes through the clearance hole in the center of the planar mirror (70) bonded to the mount. This combination of components in the presented compact configuration create a complete, "one piece", rugged unit due to the fact that the pin hole aperture, mirror, XYZ stages, and objective lens are all bonded and bolted to a common mount. This configuration allows the unit to be used with high power laser beams where as other designs using a pin hole aperture in the mirror itself leave the mirror substrate to bear the high power density created from focusing the laser energy with the objective lens and also forces a condition of localized heating of the mirror substrate causing distortion of the mirror and thus destroying the imaging capability of the mirror.

Referring back to FIG. 1, the reference beam (17) passes through an electro-optic phase modulator (18). An electro-optic phase modulator was chosen for its high bandwidth enabling it to be synchronized with the electro-optic amplitude modulator, the capability to be under computer control, and the integral active feedback circuit which is used to track the phase of the modulated beam and therefore produce high accuracy and repeatable phase shifts. It should be noted that any type of phase modulator with sufficient bandwidth and appropriate computer control capability such as an acousto-optic modulator, fixed optical path phase delay device, dielectric optical path phase delay device, or piezo electric transducer driven mirror, may also be used with out departing from the spirit and scope of the invention. The electro-optic phase modulator (18) allows the system to create a series of interference intensity distributions of known phase separation. The now phase and amplitude modulated laser beam is reflected off the phase tracker (19), which is a piezo electrically driven front surface mirror. The phase tracker (19) is driven by the signals from the object excitation driver and signal comparator circuit in the laser range finder portion of the system to be described later. The phase tracker allows the DLSP system to make measurements without effect from low frequency oscillatory motions of the object under test thus eliminating a major source of phase error. The reference beam then passes through the beam combiner system (20). With the aid of FIG. 3, the reference beam (65) passes through the integral spatial filter and mirror assembly, previously presented in FIG. 4, where it impinges on a one degree wedged faceplate (64) of the CID camera (65). This design allows for a pure undisturbed reference beam to impinge on the surface of the CID camera. Hence dust and dirt will not have phase effects which create spurious noise signals in the digital image. The wedged faceplate is used to eliminate optical noise produced by internal reflections between the front and back surfaces of the faceplate while protecting the active element surface of the camera. The image beam, which is the reflected energy from the object beam projecting on the object under test, is reflected from the object on to the front surface mirror (30) of FIG. 1, where it is reflected on to the front surface mirror of the integral spatial filter and mirror assembly (16) of FIG. 1. This mirror then reflects the image on to the image lens assembly (61) of FIG. 3. The image beam (60) passes through the image lens assembly which consists of a series of imaging lenses, with the focusing lens on a computer controlled motorized linear positioning stage, and a field stop. This allows computer controlled focusing of the image on to the beam combiner (63) where the image is reflected on to the faceplate (64) where by it interferes with the reference beam to produce an interference intensity distribution on the active area of the CID camera (65). A CID camera was chosen for high resolution, high sensitivity, and simple geometric pixel shapes resulting in ease of signal processing due to the elimination of geometric compensation algorithms.

Referring to FIG. 2, the range finder portion of the DLSP system is a frequency shifted common path interferometer which consists of a variable wavelength polarized laser diode (34) which emits a laser beam (35) which passes through an acousto-optic modulator (36) from which the laser beam is modulated between two spatially separated states. The zero order beam (37) from the modulator (36) passes through a polarization beam splitter (38) and a quarter wave plate (39), through a clearance aperture in the illumination mirror (30), of FIG. 1, on to the object under test. The reflected energy from the object under test, passes back through the aperture in the illumination mirror (30), of FIG. 1, to the quarter wave plate (39). Since the polarization state of the return laser beam has changed upon reflection from the object, the beam then becomes linearly polarized by the quarter wave plate (39) and is directed by the polarizing beam splitter (38) towards the second polarizing beam splitter (41) into the light sensitive photodetector (42). The first order beam (43) from the acousto-optic modulator (36) passes to a second acousto-optic modulator (44) through a half wave plate (45) whereby it is directed by the polarizing beam splitter (41) to the target and back into the light sensitive photodetector (42). The signals from the photodetector are then processed by comparator electronics (46) which feed a signal to frequency mixer electronics (47) to drive both acousto-optic modulators (36) and (44). This system uses frequency shifting techniques to create a common path interferometer for optic distance measurements. It should be note that any distance measuring interferometric device may also be used with out departing from the spirit and scope of the invention. The signal from the comparator electronics is also sent to the drive electronics for the phase tracker (19), of FIG. 1. The internal laser range finder and phase tracking systems allow the DLSP to preform vibration mode analysis without having to decouple the DLSP system from the normal vibratory environment. The DLSP system actively compensates for externally induced vibration noise to ensure accurate measurements.

Referring to FIG. 5, the Dynamic Laser Speckle Profilometer methodology pertains to the creation of phase maps from intensity distributions. The four intensity distribution frames (94, 95, 96, 97), from the CID camera, correspond to four separate phase conditions created by the phase modulator. The Carre' phase algorithm (98) is then applied to the intensity distribution frames (94, 95, 96, 97). The results from the Carre' phase algorithm (98) are then searched for bad pixel data (100) due to poor exposure. If the conditions for good pixel data are not met, then the DLSP system retakes a new set of four intensity distribution frames. If the pixel data is found to be satisfactory then the data is applied to a point by point continuity criterion (101) which is used to determine the correct solution to the Carre' Phase Algorithm for each point that is in the data set. The data is then passed through a resolution check (102) and the Nyquist constraint (103) which are both ways to resolve ambiguities in the data set. The data set is then passed through recursive speckle elimination outline by the dashed line box (104). This recursive speckle elimination technique is used when data is taken under poor or noisy conditions at low signal levels. This condition may express itself as gradual distortion of a type of speckle noise. The recursive speckle elimination technique is an algorithm to eliminate the noise from a noisy image and is preformed by computing the local means (120) and local variances (121) in the signal for the entire image area and applying a filter (122). A determination is then made to send the signal to form the phase map or to return the signal for recomputation of the local means and variances. The entire computational process of FIG. 5 creates a phase map (105) of the surface of the object under test.

Referring to FIG. 6, the Dynamic Laser Speckle Profilometer methodology also pertains to the creation of deformation and resonance mode maps from phase maps. The method takes two phase maps of different conditions (106, 107) and subtracts them from each other (108) to create a relative displacement map (110), to which a zeroth order fringe (111), for dynamic data, or a null test (113), for static data, or an operator supplied point of known phase (112) can be applied to calculate the absolute phase map (114), from which deformation maps and resonance mode maps (115) can be constructed. Further post processing of the data (116) will provide derivatives of the absolute phase map for displacement maps, stress and strain maps, and bending moments, which are all used for mode analysis, finite elemental analysis, deformation profilometry, and resonance analysis.

The DLSP system can create fringe maps using a series of intensity distributions, standard image processing techniques such as Look Up Table transformations, median filtering, and the recursive speckle elimination technique. Further analysis of the fringe map by recursive fringe enhancement techniques and derivative computations can be used to create displacement, strain and slope, and bending moment data. This methodology is current state of the art for optical nondestructive test systems but is cumbersome and allows display of only part of the total data extracted by the DLSP system. Therefore, the Dynamic Laser Speckle Profilometer method, previously described, takes the system beyond current state of the art and provides the required data content for true nondestructive testing of materials, components, and assemblies.

I claim:

1. A dynamic laser speckle profilometer comprising:
   a laser for generating a laser beam;
   an electro-optic amplitude modulator;
   a beam splitting coupler for splitting the beam of said laser into first and second beams;
   an first spatial filter positioned in the path of said first beam;
   projection means for projecting said first beam from said first spatial filter;
   an electro-optic phase modulator to increment the phase of said second beam relative to said first beam;
   a second spatial filter located for said second beam to pass through;
   combining optics means for combining said first and second beams;
   camera means for forming an image from said combined first and second beams; and
   processing means for producing a phase map of the image signals from said combined beams imaged from said camera.

2. A dynamic laser speckle profilometer in accordance with claim 1 in which a phase tracker is located in said second beam path for synchronizing said second beam relative to an object under test.

3. A dynamic laser speckle profilometer in accordance with claim 2 having a range finder connected to said phase tracker and positioned to continuously measure the range of an object in the path of said object beam.

4. A dynamic laser speckle profilometer in accordance with claim 3 in which a electro-optic amplitude modulator has an active feedback circuit.

5. A dynamic laser speckle profilometer in accordance with claim 4 in which said laser is a single frequency, polarized visible laser.

6. A dynamic laser speckle profilometer in accordance with claim 5 in which said first spatial filter is an integral spatial filter and mirror assembly.

7. A dynamic laser speckle profilometer in accordance with claim 6 in which said second spatial filter is an integral spatial filter and mirror assembly.

8. A dynamic laser speckle profilometer in accordance with claim 7 in which said combining optics consists of said first and second integral spatial filter and mirror assemblies.

9. A dynamic laser speckle profilometer in accordance with claim 8 in which said laser, said beam splitter, and said electro-optic phase modulator are controlled by a common central processing unit.

10. A dynamic laser speckle profilometer method for producing a phase map of an object comprising the steps of:
- generating a series of digitally stored intensity distribution images corresponding to a plurality of different sets of phase offset values;
- applying a Carre' Phase Algorithm;
- checking the data set for bad pixels;
- applying a point by point continuity criterion;
- checking the speckle resolution and Nyquist constraint for verification of the quality of the data set;
- computing local means and local variances; and
- applying a filter to the image area.

11. A dynamic laser speckle profilometer method for producing a phase map of an object in accordance with claim 10 including the step of applying the data set to a recursive speckle elimination algorithm to eliminate noise from the data following checking the speckle resolution and Nyquist constraint for verification of the quality of the data set.

12. A dynamic laser speckle profilometer method for producing a phase map of an object in accordance with claim 11 in which the step of generating a plurality of different sets of phase offset values includes generating a series of digitally stored intensity distribution images corresponding to four different sets of phase offset values.

13. A dynamic laser speckle profilometer method for producing a deformation map and a resonance mode map of an object comprising the steps of:
- subtracting a series of phase maps from each other to create a relative displacement map;
- applying a zeroth order fringe, or a null test, or operator supplied point of known phase;
- calculating the absolute phase map;
- constructing deformation maps;
- constructing resonance mode maps;
- post processing data providing derivatives of the absolute phase map;
- constructing displacement maps;
- constructing stress and strain maps; and
- calculating bending moments.

14. A dynamic laser speckle profilometer method for producing a deformation map and a resonance mode map of an object in accordance with claim 13 including the step of applying a zeroth order fringe to said relative placement map.

15. A dynamic laser speckle profilometer method for producing a deformation map and a resonance mode map of an object in accordance with claim 13 including the step of applying a null test to said relative placement map.

16. A dynamic laser speckle profilometer method for producing a deformation map and a resonance mode map of an object in accordance with claim 15 including the step of applying an operator supplied point of known phase to said relative placement map.

* * * * *

UNITED STATES PATENT AND TRADEMARK OFFICE
CERTIFICATE OF CORRECTION

PATENT NO.  : 5,020,904
DATED       : June 4, 1991
INVENTOR(S) : Robert K. McMahan, Jr.

It is certified that error appears in the above-identified patent and that said Letters Patent is hereby corrected as shown below:

Column 1, line 6, should read as follows:

This invention was made with Government support
   under Contract NAS1-18848 awarded by NASA. The
   Government has certain rights in this invention.

Signed and Sealed this

Eighteenth Day of January, 1994

*Attest:*

BRUCE LEHMAN

*Attesting Officer*    *Commissioner of Patents and Trademarks*